US006421507B1

(12) United States Patent
Heemstra

(10) Patent No.: US 6,421,507 B1

(45) Date of Patent: Jul. 16, 2002

(54) METHOD OF PRODUCING A SCREEN FOR A DISPLAY DEVICE, SCREEN FOR A DISPLAY DEVICE PRODUCED BY MEANS OF SAID METHOD AND DISPLAY DEVICE PROVIDED WITH SAID SCREEN

(75) Inventor: Tewe H. Heemstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/550,606

(22) Filed: Apr. 14, 2000

(30) Foreign Application Priority Data

Apr. 16, 1999 (EP) .......................................... 99201179

(51) Int. Cl.[7] ............................................ G03B 41/00

(52) U.S. Cl. ......................... 396/546; 396/548; 430/23

(58) Field of Search ................................ 396/546, 548, 396/547; 430/23, 24; 359/834, 836, 837

(56) References Cited

U.S. PATENT DOCUMENTS 3,544,200 A * 12/1970 Boll .......................... 359/226
3,547,526 A * 12/1970 Devereux ................... 359/729
4,052,123 A * 10/1977 Yamazaki et al. .......... 359/742
4,187,012 A * 2/1980 Ueyama et al. ............. 396/547
4,211,477 A * 7/1980 Ueyama et al. ............. 396/547
4,340,275 A * 7/1982 Henkes ....................... 359/456
4,866,466 A * 9/1989 van der Waal .............. 396/547
5,844,355 A * 12/1998 Wang ......................... 313/461

FOREIGN PATENT DOCUMENTS

GB 1577503 10/1980 ............ H01J/9/227

* cited by examiner

*Primary Examiner*—David M. Gray

(57) ABSTRACT

A screen having a dotted structure of apertures in a black matrix and electroluminescent material in the apertures is produced on a panel for a color display device. A photosensitive material on the panel is exposed to light emitted by a point source. The light is passed through a segmented lens and a mask. The segmented lens has an array of facets with boundaries between them. At least two of the facets have respective top surfaces inclined at mutually different angles. Each facet of the array of facets is provided with a light-refracting means having a base surface coinciding with its top surface and at least a first and a second light-refracting surface disposed at predetermined angles with respect to the base surface, thereby creating a number of virtual light sources corresponding to the number of light-refracting surfaces. Simultaneously with the exposure of the photosensitive material, the relative position between the segmented lens and the panel is changed in a direction oblique to the boundaries of the facets. The extent and direction of changing the relative position our such that, in moving from one extreme position to another extreme position, an image of a first facet on the panel occupies substantially an extreme position previously occupied by an image of a second facet obliquely adjacent to the first facet.

8 Claims, 9 Drawing Sheets

METHOD OF PRODUCING A SCREEN FOR A DISPLAY DEVICE, SCREEN FOR A DISPLAY DEVICE PRODUCED BY MEANS OF SAID METHOD AND DISPLAY DEVICE PROVIDED WITH SAID SCREEN

FIELD OF THE INVENTION

The invention relates to a method of producing a screen on a panel for a color display device, which screen comprises a dotted structure of apertures in a black matrix and electroluminescent material in said apertures in which method a photosensitive material on the panel is exposed to light emitted by a point source and passed through a segmented lens and a mask, the segmented lens comprising an array of facets with boundaries between them, at least two of the facets having a top surface which is inclined at different angles and simultaneously changes the relative position of the segmented lens and the panel in a direction oblique to the boundaries of the facets during exposure of the photosensitive material, the extent and direction of changing the relative position of the segmented lens and the panel being such that, in moving from one extreme position to another extreme position, an image of a first facet on the panel occupies substantially an extreme position previously occupied by an image of a second facet obliquely adjacent to the first facet.

The invention also relates to a screen produced by using such a method and to a color display device provided with such a screen.

BACKGROUND AND SUMMARY OF THE INVENTION

A method of producing a screen for a color display device as described above is disclosed in U.S. Pat. No. 4,866,466. The method according to this specification describes an exposure process for manufacturing screens for color display devices, like cathode ray tubes.

On the inside of the panel, which is the glass faceplate, cathode ray tubes (CRTs) are provided with the so-called screen. This screen has a black matrix structure and electroluminescent material in the apertures left free by the black matrix. The structure of the black matrix in most common CRTs is either a dotted structure or a line structure. This structure is produced by exposing a photosensitive material that is deposited on the inside of the panel and by using an exposure system and the shadow mask serving as the color selection means in CRTs. For exposing line-type CRTs, an exposure system with a continuous exposure lens can be used. However, for dotted-type CRTs, it is common practice to apply a segmented exposure lens in order to have enough degrees of freedom to obtain a dotted structure on the screen that fulfills the requirements regarding good landing properties. Landing in a CRT is the quality that defines how well the electron beams hitting the screen coincide with the corresponding electroluminescent material.

After the black matrix layer has been applied on the inside of the panel, another photosensitive process is used for applying the electroluminescent material—for instance, three colors of phosphor like red, green and blue—to the areas of the panel that were left free by the black matrix structure.

In producing a screen with a dotted structure, light from a point source is directed through the segmented lens and the shadow mask. This segmented lens comprises a rectangular array of differently inclined facets If the screen is illuminated through a stationary segmented lens, the images of consecutive facets will not fit as consecutive areas on the screen. This will cause dark and light lines, during the exposure process, in the areas where the images of two consecutive facets are disjunct or overlap, respectively. This phenomenon is normally referred to as facet marking. In order to obtain a substantially uniform illumination across the entire screen, the segmented lens is wobbled and drifted in oblique directions with respect to the rectangular array of facets. The wobble and drift directions are mutually nearly orthogonal, In this method the image of one facet is spread across a larger area so that the light and dark lines are faded to such an extent that facet marking is considerably reduced and even prevented.

In the currently used method of producing screens by exposure, the use of a point source for illuminating the screen daring exposure leads to a screen structure that closely resembles the mask structure. If, for instance, the mask has a structure of round apertures, the apertures in the black matrix will also be substantially round. For new designs of dotted-type tubes, it is often recognized that the currently used method has its drawbacks.

The structure of a dotted-type screen is, amongst others, determined by the horizontal and by the vertical pitch. In this context pitch means the distance between phosphor dots of the same color. In general, a small pitch is desired in order to obtain a good resolution of the screen. On the other hand the vertical pitch should be chosen to be such that the scan-moiré phenomenon is suppressed as much as possible. In order to fulfill these two requirements it appears that it is generally not possible to use a purely hexagonal screen structure. For instance, if the desired vertical pitch is increased with respect to the pitch corresponding to a hexagonal structure, the circular apertures in the black matrix lead to less electroluminescent material on the screen. As a consequence, the display device will have a lower luminance (light output).

In most commonly used CRTs, the screen is scanned in two directions. The line scan, being the higher frequency, is usually in the horizontal direction, while the frame scan, being the lower frequency and perpendicular to the line scan, is in the vertical direction. It is remarked that the frame direction is not per se the vertical direction. The frame direction in the vertical direction is not to be considered limitative.

The interaction between the mask and the consecutive lines causes the scan-moiré phenomenon. It is a disadvantage of the screens produced by means of the method mentioned in of the opening paragraph that a good moiré performance is mostly at the expense of the luminance.

It is an object of the invention to provide an improved method as compared with the method described in the opening paragraph, of producing a screen with a dotted structure for a color display device.

According to the invention, this object is realized with a method which is characterized in that said facets comprise light-refracting means having a base surface coinciding with the top surface of the facet and at least a first and a second light-refracting surface disposed at predetermined angles with respect to the base surface, thereby creating a number of virtual light sources corresponding to the number of light-refracting surfaces.

The invention is based on the recognition that, by providing each facet with light-refracting means having at least two light-refracting surfaces, the real point source viewed from the screen—is subdivided in to a number of virtual light sources equal to the number of light-refracting surfaces. The light-refracting means may be, for example, a prism structure.

It is to be noted that, for instance, British Patent Specification 1 577 503 discloses a rectangular structure of small prisms with two light-refracting surfaces. The purpose thereof is to create two virtual line-shaped light sources in order to be able to control the phosphor line width across the entire screen of a CRT. In contrast to the present invention, which is meant for CRTs with a dotted screen and a black matrix structure, the CRT described in said British Patent Specification is a tube with a line structure on the screen, originating. from a striped shadow mask and without a black matrix. By changing the distance between the two virtual light sources across the screen, a compromise can be achieved in this case between the phosphor line width and the phosphor adhesion on the screen. Although the use of prisms creating virtual light sources is known per se, the present invention describes a totally different measure compared to said British Patent Specification 1 577 503.

A preferred embodiment of the method according to the present invention is characterized in that the light-refracting surfaces are inclined in the frame direction in such a way that the virtual light sources are separated in said direction.

The inclination of the light-refracting surfaces in the frame direction causes the split-up in virtual light sources to be also in the frame direction. In this embodiment, the light-refracting surfaces cause the light spot on the screen to be elongated in the frame direction and, as a consequence, the apertures in the black matrix are elongated in the frame direction as well. With this measure, an improvement with respect to moiré and luminance is achieved. It is possible to optimize the pitch in the frame direction for moiré. Moreover, the elongation in the frame direction of the apertures in the black matrix can be chosen in such a way that the amount of luminance that was lost as a consequence of the larger vertical pitch is at least compensated for.

Another drawback of the prior-art method is three exposure steps are necessary that for making the matrix structure, namely one for each color. Three apertures in the black matrix layer, commonly called a triplet, correspond to each aperture in the shadow mask. After the matrix has been applied, the three colors of electroluminescent material are deposited in the corresponding matrix apertures. As exposure of the matrix structure in three steps is time-consuming and requires expensive and complex equipment for exchanging the different exposure lenses that are needed for the patterns of the three colors, this is considered to be a drawback.

It is therefore another object of this invention to provide a simplified method of producing the black matrix structure of a screen with a dotted structure for color display devices.

An embodiment of the method according to the present invention is characterized in that the light-refracting means has three light-refracting surfaces, the two outer surfaces being inclined in the line direction in such a way that the virtual light sources are separated in said direction. In this embodiment, the point light source is split into three virtual light sources that are separated in the line direction. In this case, it is possible to make the prismatic action so strong that the distance between the virtual light sources becomes so large that the three resulting spots on the screen are disjunct to such an extent that they exactly form the three spots of one triplet. A triplet is the collection of three dots on the screen, each of them having a different color of electroluminescent material, obtained by exposure through the same mask aperture. Normally, the triplet is oriented parallel to the direction of the line scan, if the beams in the electron gun are oriented in the line direction.

The invention also relates to a screen of a color display device produced by means of the method according to the invention, as well as to a color display device provided with such a screen.

BRIEF DESCRIPTION OF THE DRAWINGS

These and other aspects of the invention are apparent from and will be elucidated by way of non-limitative examples with reference to the drawings and the embodiments described hereinafter.

In the drawings.

DESCRIPTION OF THE PREFERRED EMBODIMENTS

Figure 1:
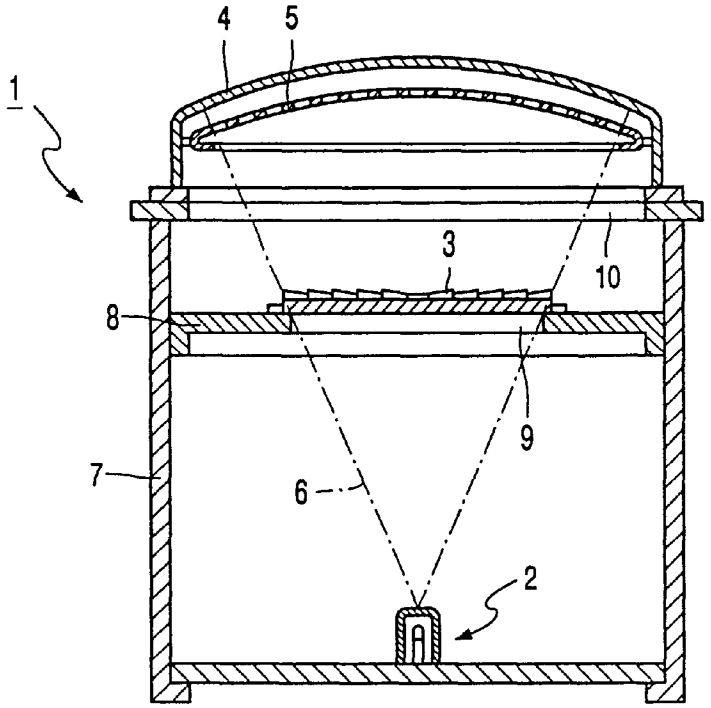
FIG. 1 is a diagrammatic vertical cross-section through a lighthouse.

The lighthouse 1, as shown in FIG. 1, is the standard exposure equipment for exposing the photosensitive material on the inside of a panel. A point light source 2 is positioned at the bottom of the housing 7. The light from this point light source 2 passes the aperture 9 in the support 8 for the segmented lens 3. After having passed said segmented lens 3, the light travels through the aperture 10 in the top of the lighthouse 1, through the mask 5, towards the inside of the panel 4. The dashed lines 6 indicate the aperture angle of the light beam coming from the point light source 2, showing that in this example the entire screen will be exposed.

Figure 2:
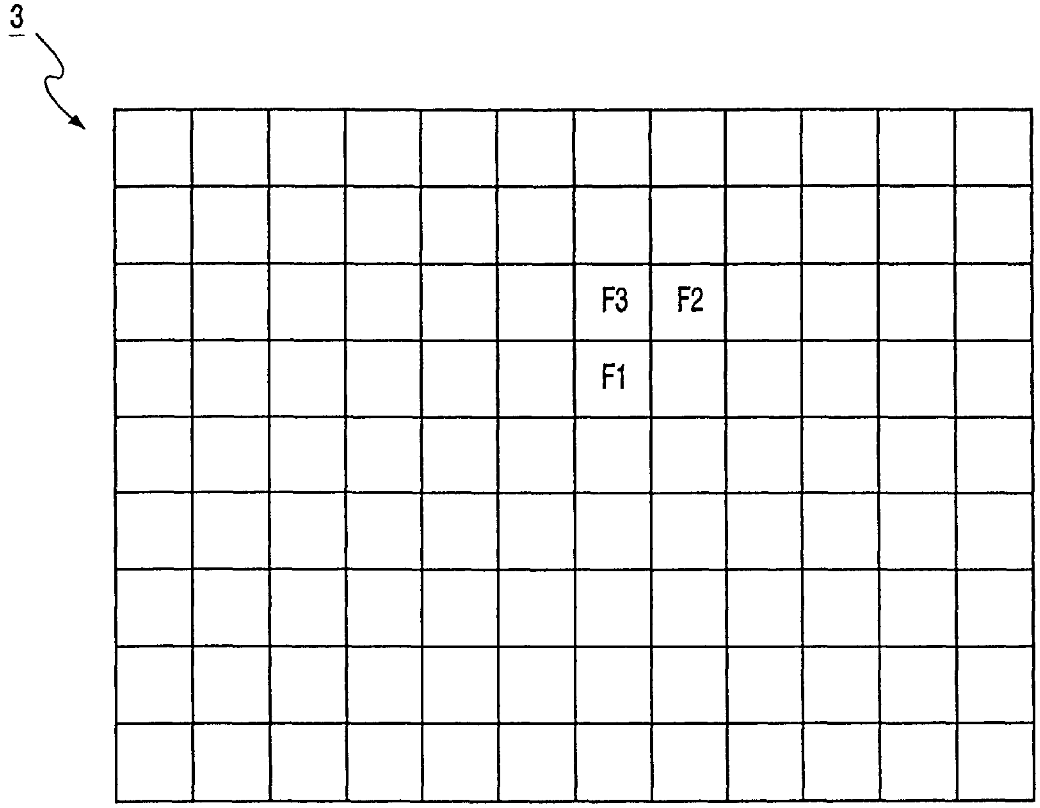
FIG. 2 is, in a top view, the rectangular array structure of a segmented lens according to the prior art.

FIG. 2 shows a top view of the segmented lens 3. Such a lens comprises a plurality of segments, which are commonly called facets, and some of them are denoted by F1, F2 and F3. For example, an array of twenty-one facets in the horizontal direction and seventeen in the vertical direction may be used for a segmented lens, each facet having dimensions of $8*8\ mm^2$. Normally, the bottom side of a segmented lens is flat, and on the top side the inclination of all the separate facets is chosen to be such that the light coming from the point light source 2 (FIG. 1) is refracted in such way that the light rays coincide substantially with the deflected electron trajectories for a given point on the screen.

Figure 3:
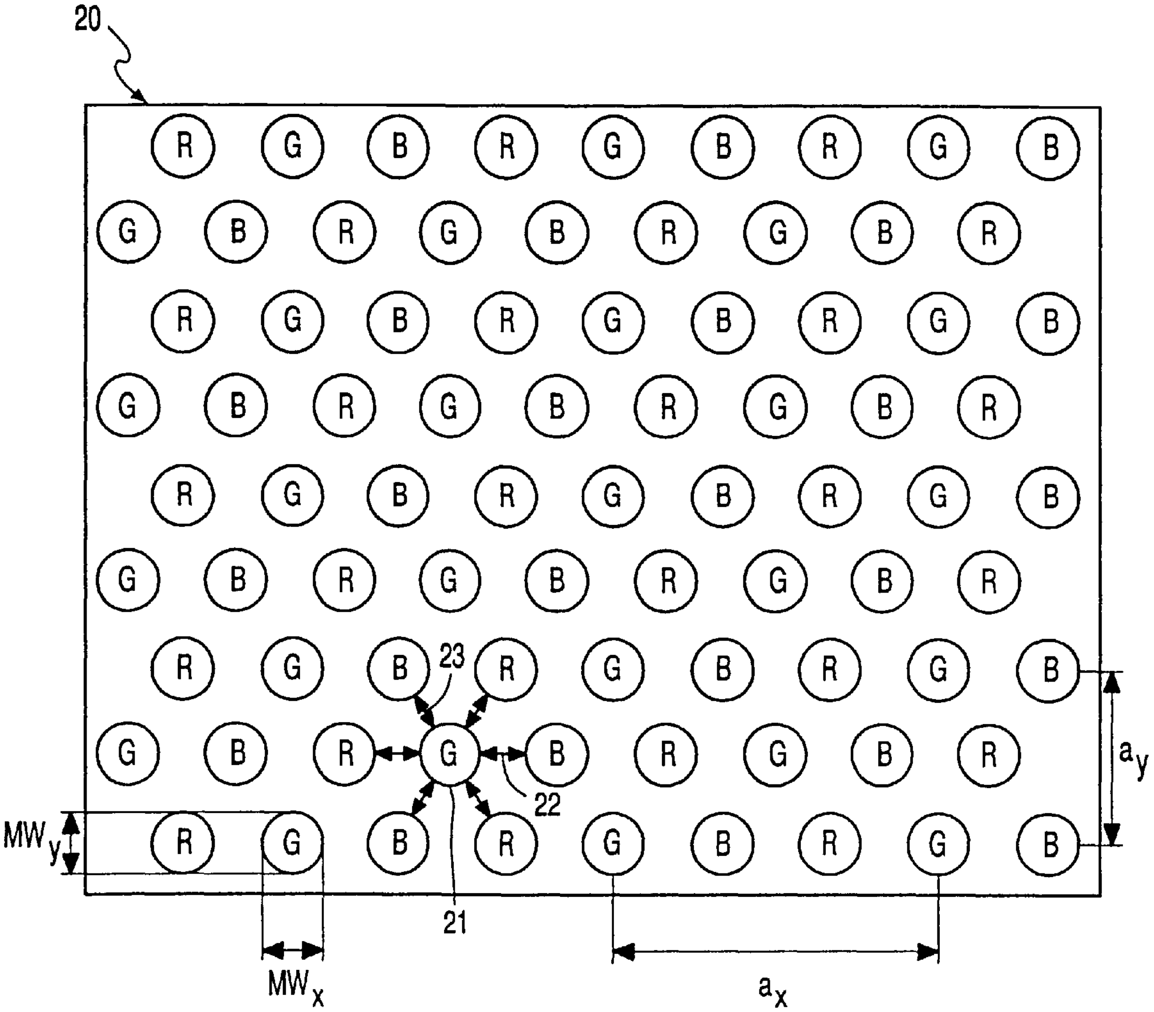
FIG. 3 is an example of the prior-art matrix structure on a screen.

In conventional CRTs with a dotted screen structure and with circular dots, the filling of the screen is chosen to be optimal. This means that the structure is purely hexagonal, so the horizontal pitch is √3 times the vertical pitch, resulting in a guardband that is equal between all adjacent phosphor dots. The guardband is defined as the distance between two adjacent phosphor dots and is a measure of the amount of mislanding a CRT can handle before becoming color impure. Mislanding is the distance between the center of the aperture in the matrix on which the electron beam should land and the position of the electron beam. The pitch is defined as the distance between the centers of two adjacent phosphor dots of the same color. In FIG. 3, a phosphor-matrix structure of the screen 20 is shown for such a conventional CRT, in which $a_x$ is the horizontal pitch, $a_y$ is the vertical pitch, $MW_x$ is the aperture size or matrix window in the horizontal direction, $MW_y$ is the aperture size or matrix window in the vertical direction, 22 is the guardband in the horizontal direction, and 23 is the guardband in the oblique direction. In this FIG., the three phosphor colors are denoted R, G and B, for red, green and blue, respectively. In case of a purely hexagonal structure and circular dots, the guardband is equal in all directions.

The matrix transmission for each of the phosphor colors is defined as that part of the screen that is filled with the corresponding phosphor. The matrix transmission MT (for one color) can be calculated from the geometry of a screen, as given in FIG. 3:

$$MT = \frac{\pi \cdot MW_x \cdot MW_y}{2 \cdot a_x \cdot a_y}$$

with:

$MW_x$, $MW_Y$ the matrix window in the horizontal and vertical directions.

$a_x$, $a_y$ the horizontal and vertical pitch.

As a typical example, the matrix transmission MT can be calculated to be 14.5% for a circular dot of 100 μm diameter, a horizontal pitch $a_x$ of 432 μm and a vertical pitch $a_y$ of 250 μm.

Figure 4:
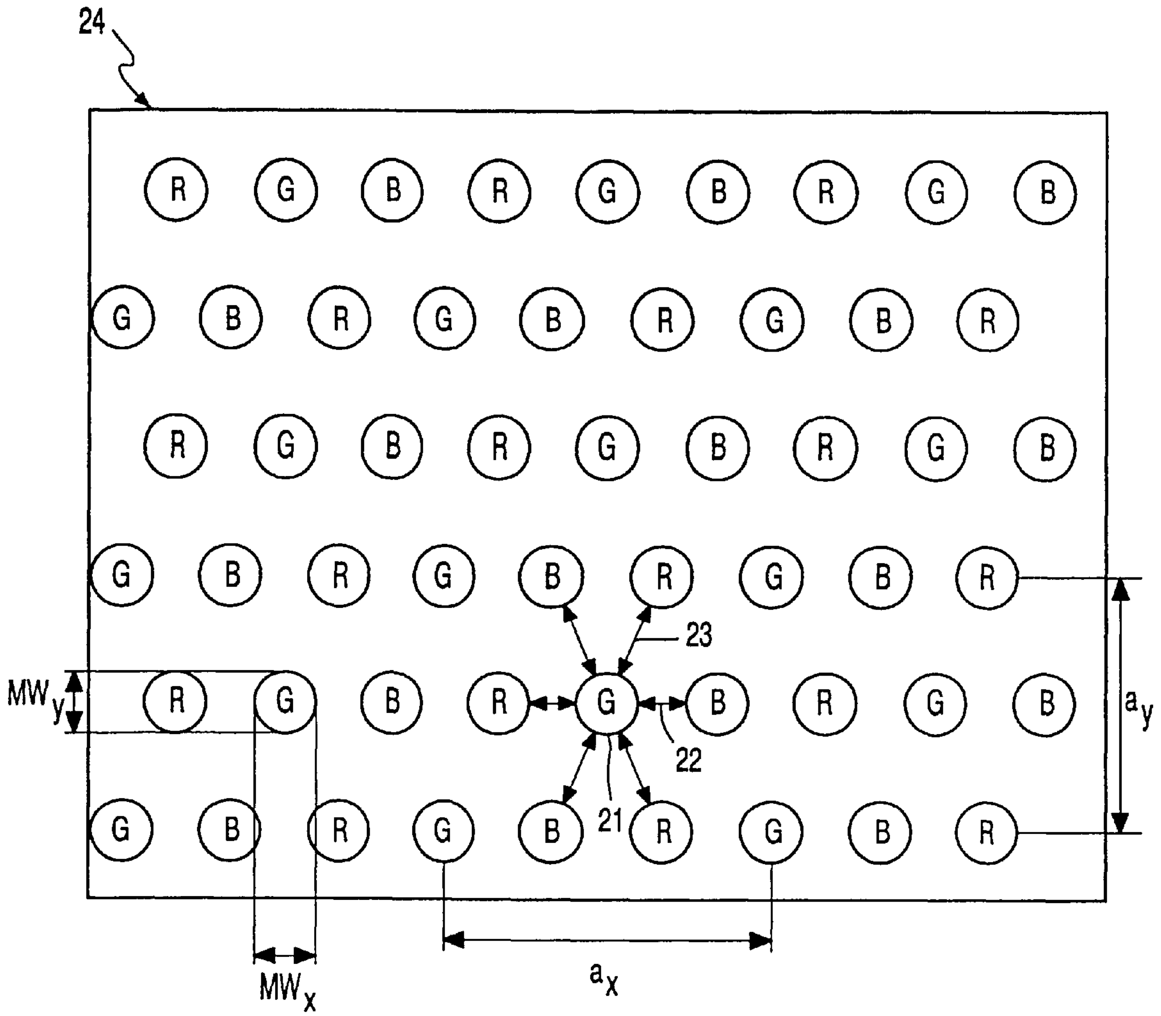
FIG. 4 is a matrix structure with an increased vertical pitch, according to the prior art.
Figure 5:
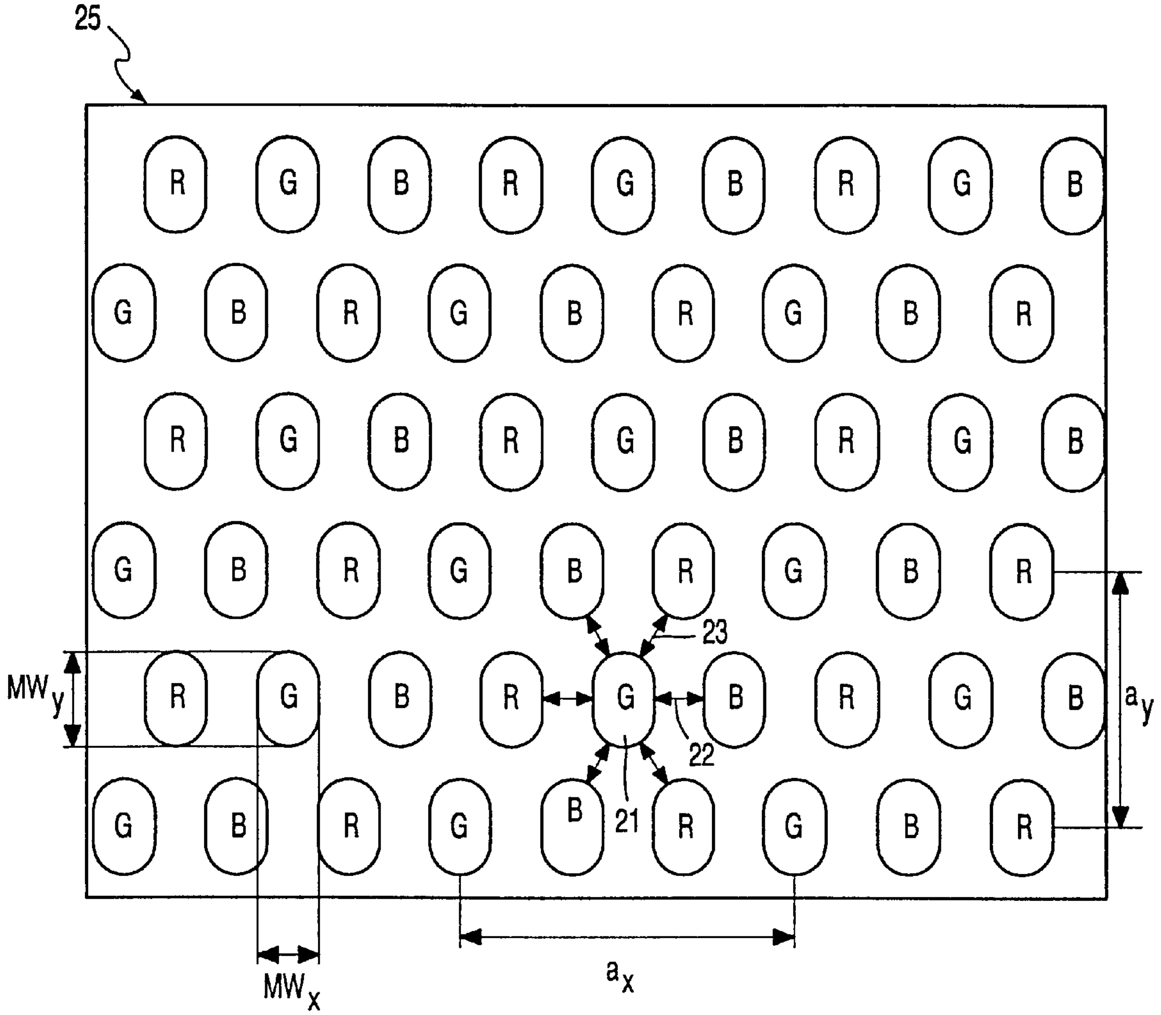
FIG. 5 is a matrix structure with an increased vertical pitch and vertically elongated apertures, according to the invention.

In order to prevent moiré to become visible, it may, for instance, be necessary to increase the vertical pitch $a_y$. This situation is illustrated in FIG. 4, in which the other parameters of the screen 24, like dot size and horizontal pitch have remained unaltered. Now assuming an increase of the vertical pitch from 250 μm to 290 μm, it can be calculated that the matrix transmission will drop to 12.5%, which is a relative decrease of 14%. This also results in a 14% decrease of the luminance. A larger vertical pitch will increase the guardband in the oblique direction, so the color purity of the tube will improve. In general, it will be preferred to maintain the color purity at the level of the purely hexagonal tube and to have a luminance level which is as high as possible. This can be achieved by elongating the matrix apertures in the vertical direction. FIG. 5 shows a structure for a screen 25 with an increased vertical pitch and with elongated apertures. The shape of the apertures is that of a racetrack, that is, two semi-circles connected by two line pieces. The length of these line pieces equals half the increase of the vertical pitch $a_y$ with respect to the purely hexagonal situation. In doing so, this leaves the guardband unaltered. For matrix apertures having this shape, the formula for the matrix transmission MT is modified to:

$$MT = \frac{\pi \cdot MW_x^2 + 4 \cdot MW_x \cdot (MW_y - MW_x)}{2 \cdot a_x \cdot a_y}$$

in which the second term in the nominator describes (apart from the factor 4) the part of the area of the matrix aperture that is situated between the two semi-circles. For the above given example, where the vertical pitch $a_y$ is increased from 250 μm to 290 μm, the elongation of the matrix aperture will then be 20 μm, leading to a matrix transmission of 15.7%, which is an increase of relatively 8% over the pure hexagonal situation. So, the gain in luminance by applying racetrack apertures instead of circular apertures, both at an increased vertical pitch, is 25% in this example.

Figure 6A:
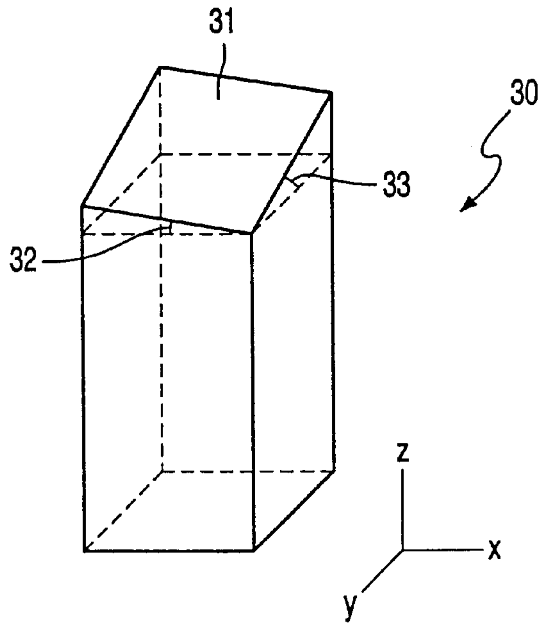
FIG. 6A is a schematic drawing of an isolated facet of the segmented lens according to the prior art.
Figure 6B:
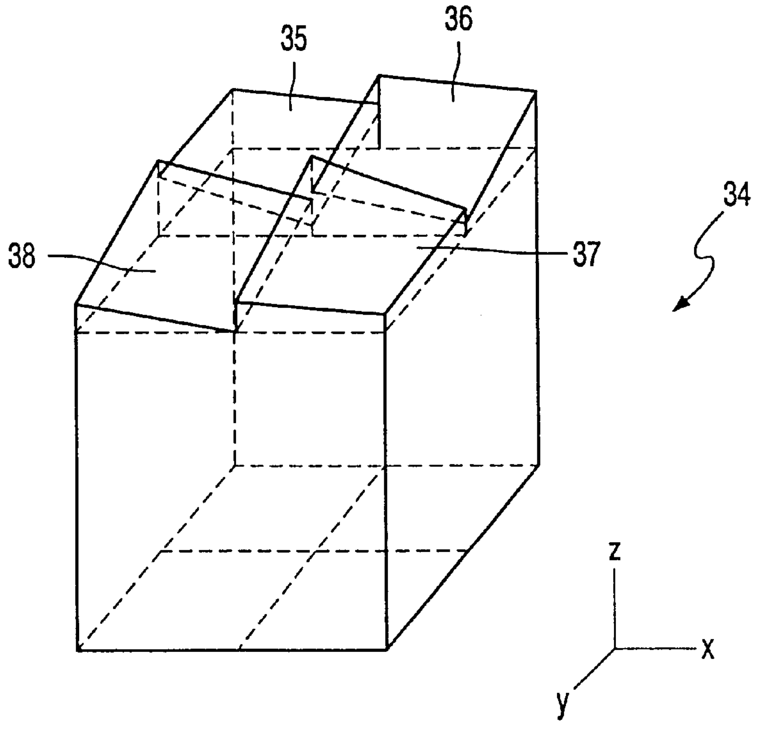
FIG. 6B is a schematic drawing of a group of four facets of the segmented lens according to the prior art.

One single facet 30 from a segmented lens according to the prior art is shown in FIG. 6A. In this example, the topside 31 of the facet 30 has an inclination in two directions, denoted by the numerals 32 and 33. FIG. 6B shows a group 34 of four facets 35, 36, 37 and 38, each having a somewhat different facet angle. This Figure is to illustrate a part of the segmented lens, showing that the boundaries between the different facets are only drawn for presentation reasons. In practice, a segmented lens is manufactured by using a molding process, leading to a lens made of. one piece with all the facets being the top side of the lens.

In tubes according to the prior art the screen is exposed using segmented lenses with facets as are shown in FIG. 6A. A uniform illumination of the screen is obtained by a movement of the segmented lens during exposure, this movement being referred to as wobble and drift. In this method, the point light source 2, shown in FIG. 1, is used to image, for every facet 30, the aperture of the mask on the screen. These images are blurred by Fresnel diffraction at the shadow mask and by the effective solid angle of the source including the displacements caused by the wobble and drift. Apart from the wobble and drift movement of the segmented lens, in principle a one-to-one relation exists between the light spot on the screen and the point light source 2. This one-to-one relation causes the screen structure to strongly resemble the mask structure. This means that, if the mask apertures are substantially round, the black matrix apertures will be substantially round as well. If the wobble and drift is taken into account, it is seen that a point on the screen is also illuminated by neighboring facets. However, this has only a minor effect on the shape of the apertures in the black matrix, because the lamp position varies only very little between two adjacent facets.

When a screen structure is needed, as shown in FIG. 5, it is necessary to have an exposure system that renders elongated matrix apertures. This invention describes such a method, in which it is still possible to use a mask with substantially round apertures.

Figure 7:
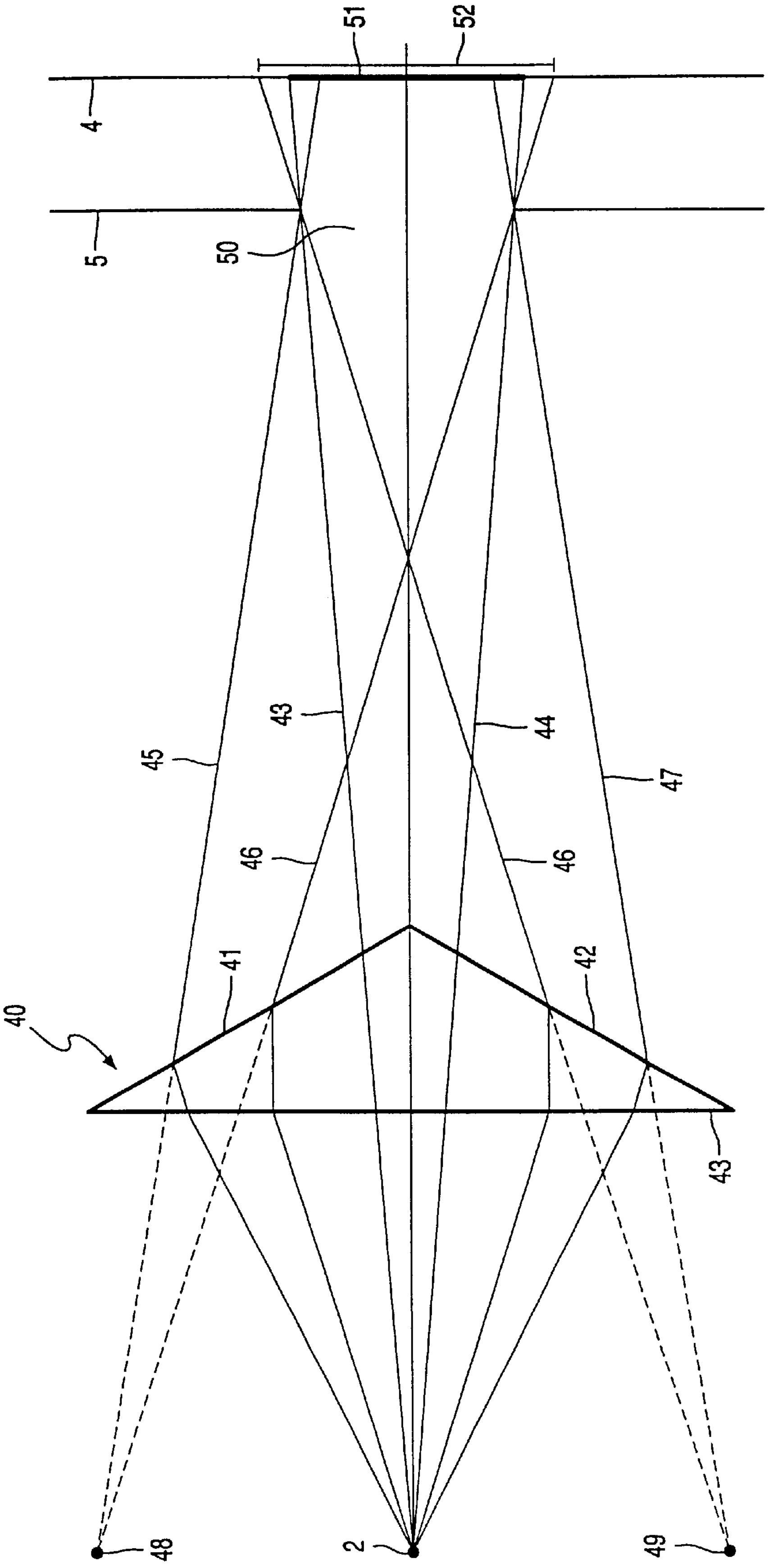
FIG. 7 is the principal idea of the two virtual light sources originating from the use of a prism.

The general idea is based on the fact that by adding a light-refracting means on top of the facets, one real light source is split into a number of virtual light sources. This is illustrated in FIG. 7, where, as an example, a prism 40 with a bottom surface 43 and two light-refracting surfaces 41, 42 are shown. If the prism is absent, only the part of the light coming from the point light source 2 that is embedded between the lines 43 and 44 will pass the mask aperture 50. The part of the panel 4 that is indicated by the solid line 51 will be illuminated in the absence of the prism. With the prism positioned between the point light source 2 and the panel 4, the light coming from the point light source 2 is refracted by the prism. The light embedded between the lines 45 and 46 will reach the panel 4 by passing the mask aperture 50 after being refracted by the top half of the prism 40, comprising the light-refracting surface 41. Looking back from the screen, this light seems to originate from the virtual point light source 48. The same holds for the bottom side of the prism 41, comprising the light-refracting surface 42. The light between the lines 46 and 47.will reach the panel and seems to come from the virtual point light source 49. The overall area on the panel 4 that is illuminated is now indicated by the line 52. It can be clearly seen that the illuminated area on the panel 4 is increased after introducing the prism. For a prism 41 as shown in FIG. 7, the light spot on the screen will be elongated in one direction, leading to elongated matrix apertures. The same effect can also be obtained by using a light-refracting means with more than two light-refracting surfaces.

In order to obtain elongated matrix apertures across the entire screen, all the facets from the segmented lens 3 have to be provided with such a light-refracting means on the topside 31. FIGS. 8A, 8B, 8C and 8D show four embodiments in which one facet has been provided with a prism with two light-refracting surfaces. The top side 31 of the original facet coincides with the bottom side 43 of the prism. Of course, in the segmented lens as used in the exposure process, the interface between the top side 31 of the original facet and the bottom a side 43 of the prism cannot be distinguished. In order to have the proper lens action the average thickness of the segmented lens with the prisms should be corrected for the presence of the prisms. Here, the segmented lens is also made of one piece. In this example, the light-refraction takes place in the. y-direction (commonly the vertical direction) for all the embodiments. This is achieved by giving all the light-refracting surfaces an inclination in the y-direction. In the embodiments 60 and 61 of FIGS. 8A and 8B, the division between the two light-refracting surfaces is parallel to the x-axis, leading to a prism with a top and bottom half. FIGS. 8C and 8D shown the embodiments 62 and 63 in which the division between the two light-refracting surfaces is parallel to the y-axis, leading to a prism with a left and a right half, but in all cases the inclination of the light-refracting surfaces is in the same direction.

For the common situation where the frame deflection is in the y-direction, the embodiments of FIG. 8 fulfill the requirement that the virtual light sources are separated in the frame direction, leading to vertically elongated matrix apertures. This allows production of a tube with an improved moiré and luminance performance.

FIGS. 9A, 9B, 9C and 9D shown four embodiments in which the prism shows three light-reflecting surfaces, in a way similar to the situation as described for the FIGS. 8. In the embodiments 64 and 65 of FIGS. 9A and 9B, the divisions between the three light-refracting surfaces are parallel to the y-axis, while in the embodiments 66 and 67 of FIGS. 9C and 9D, said divisions are parallel to the x-axis. In this example, the light-refraction takes place in the x-direction (commonly the horizontal direction), leading to virtual light sources that are separated in the horizontal direction. The inclination of the light-refracting surfaces 70 and 72 is chosen in such a way that the three light-refracting surfaces 70, 71 and 72 create three virtual light sources that are separated by such a distance that the images of these light sources on the screen are disjunct and separated by a distance corresponding to the distance between adjacent matrix apertures in a triplet. In this embodiment, the average height of the three light-refracting surfaces 70, 71 and 72 is the same and does not disturb the average lens action of the facet. This makes it possible to expose the matrix in only one step, compared to the three steps—one for each color—of the currently used exposure system. This will improve throughput time of the matrix exposure process and will also be more cost-effective.

Figure 10A:
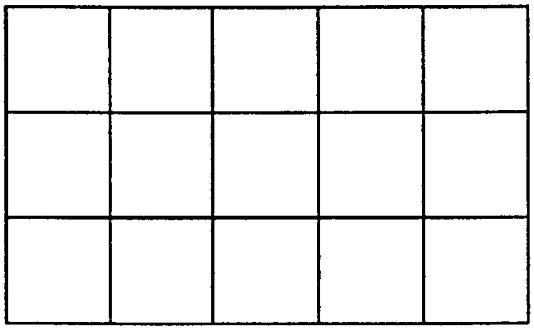
FIGS. 10A–10E are top views of different configurations of the prisms on top of a segmented lens.

This embodiment allows exposure of the matrix structure of a dotted type tube with an in-line electron gun. In such an electron gun, the apertures for the three colors are arranged in the horizontal plane. This embodiment should not be considered to be limitative. It is also possible to make a configuration of three light-refracting surfaces on each facet that exposes the triplet of a dotted type tube with a delta electron gun—where the apertures for the three colors are arranged in a triangular configuration—in one step. The screen structure for tubes with an in-line gun is similar to the screen structure for tubes with delta guns. This makes it also possible to use the embodiment of FIG. 9 for tubes with a delta gun, and vice versa, while the configuration of three light-refracting surfaces on each facet designed for exposing a triplet in a dotted type tube with a delta gun can also be used in a tube with an in-line gun. In the latter two situations, the three matrix apertures, although belonging to three different colors that are exposed through the same mask aperture, no longer correspond to one triplet The embodiments shown in FIGS. 8 and 9 hold for one facet. A segmented lens comprises a plurality of these facets, for instance, twenty-one in the horizontal direction and seventeen in the vertical direction. Such a segmented lens can be assembled in more than one way. In FIG. 10, a number of examples is given for a segmented lens comprising a light-refracting means with two light-refracting surfaces. For light-refracting means with more light-refracting surfaces, similar configurations can be drawn. FIG. 10A gives a top view of a part of a segmented lens—only 5*3 facets—according to the prior art. In FIGS. 10B–10E, all the individual facets are provided with an additional light-refracting means having two light-refracting surfaces with respect to the original facet, in which the arrows indicate the inclination of the light-refracting surface, pointing in a downward direction of the surface. Such a light-refracting means is, for instance, a prism.

Figure 8A:
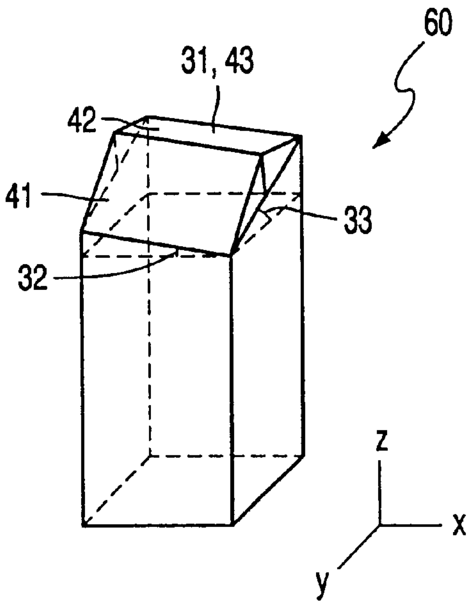
FIGS. 8A, 8B, 8C and 8D are examples of one single facet of the segmented lens provided with light-refracting means with two light-refracting surfaces.
Figure 8B:
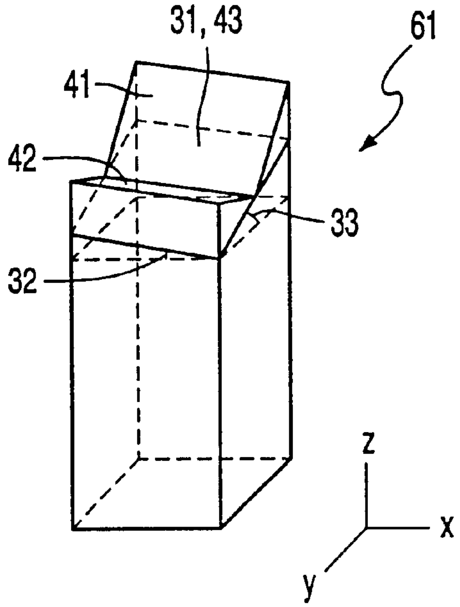
Figure 8C:
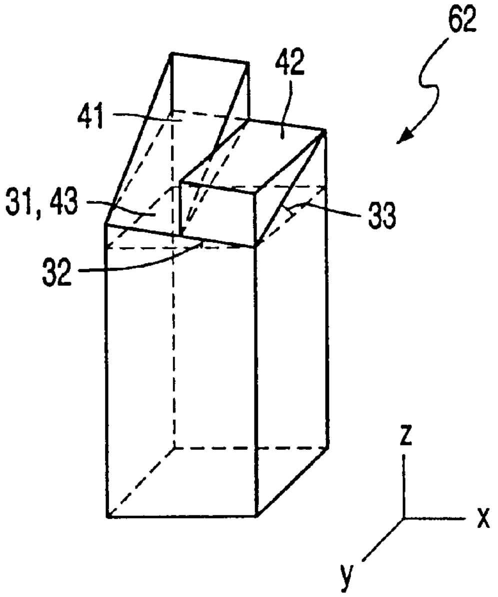
Figure 8D:
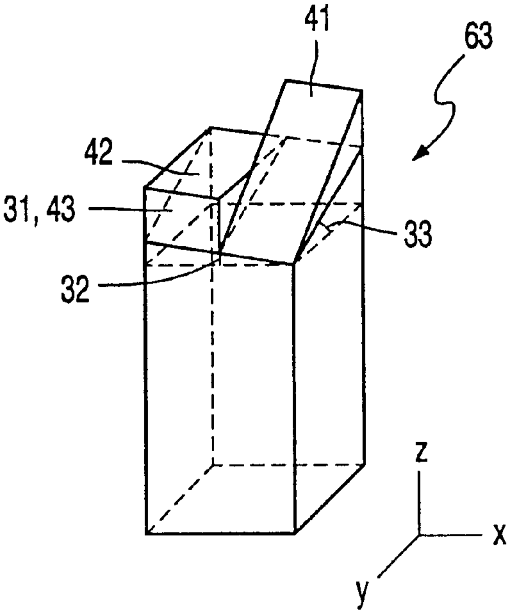
Figure 9A:
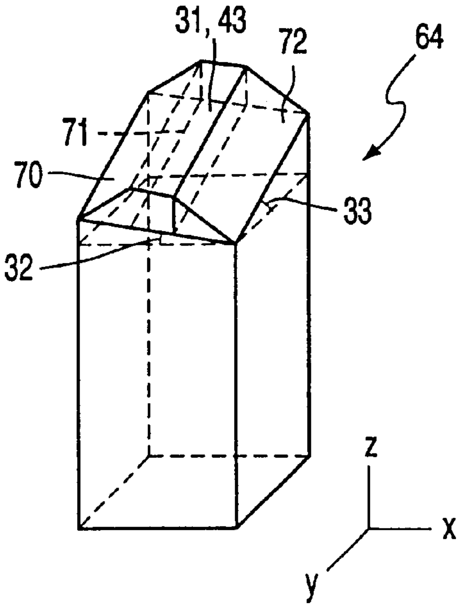
FIGS. 9A, 9B, 9C and 9D are examples of one single facet of the segmented lens provided with light-refracting means with three light-refracting surfaces.
Figure 9B:
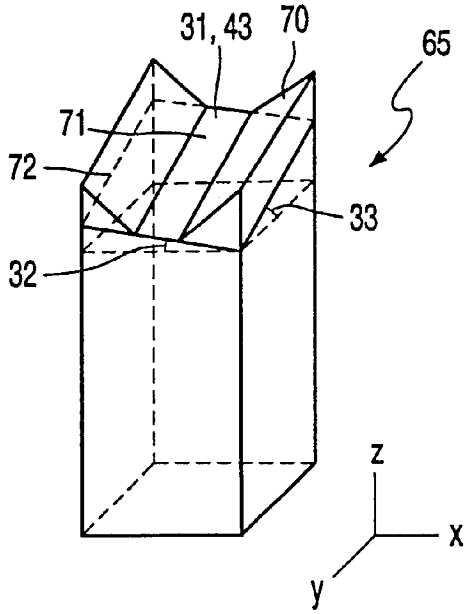
Figure 9C:
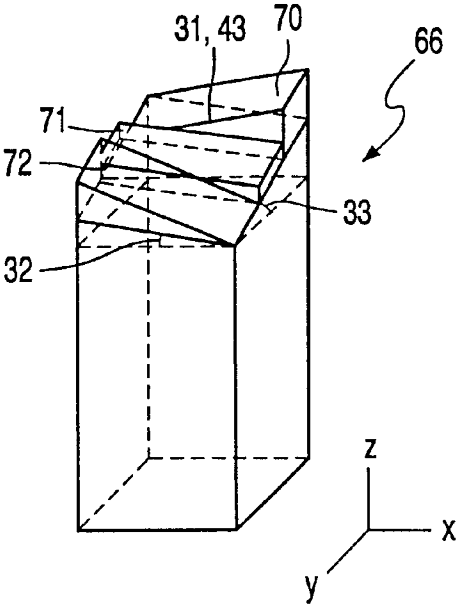
Figure 9D:
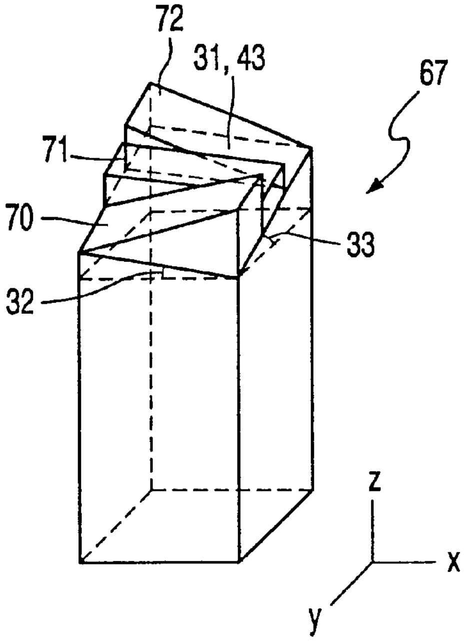
Figure 10B:
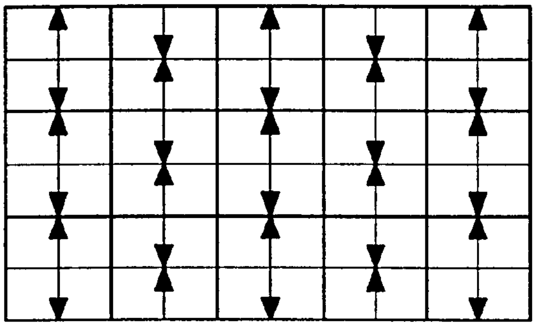
Figure 10C:
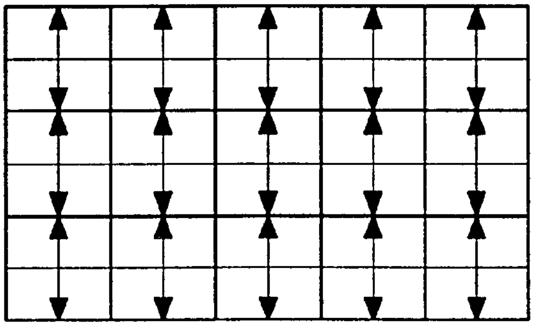
Figure 10D:
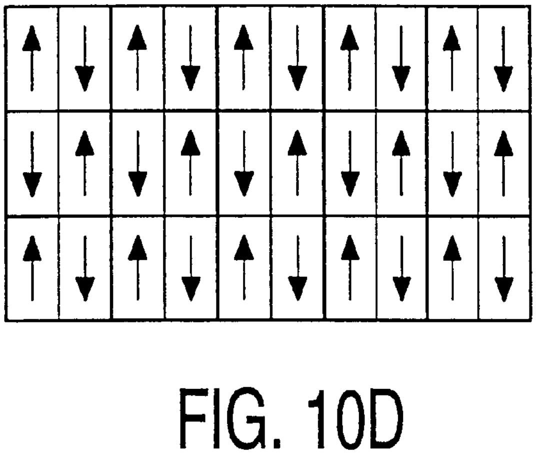
Figure 10E:
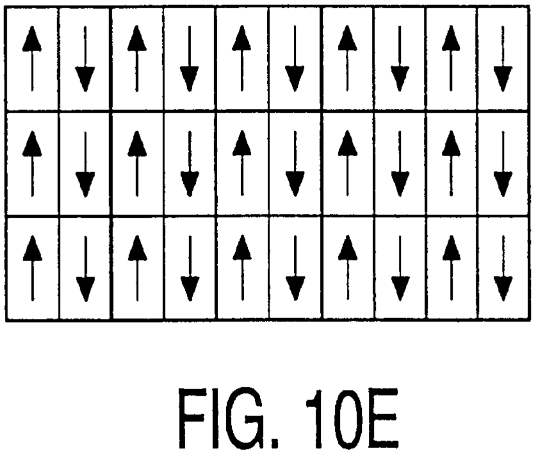

In FIG. 10B, the top left facet is made according to FIG. 8A. The next one to the right is made according to FIG. 8B, and so on. By using facets as shown in FIGS. 8A and 8B, configurations of a segmented lens as shown in FIG. 10B can be made in this way, having a checkerboard pattern and, in FIG. 10C, a row structure. For the facets as shown in FIG. 8C, other structures can be made. FIG. 10D shows an alternative checkerboard pattern, and FIG. 10E shows a column structure. Of course, these structures for assembly of a segmented lens are shown by way of example and are not exhaustive; the same ideas can also be applied for facets provided with more than two light-refracting surfaces.

What is claimed is:

1. A method of producing a screen on a panel for a color display device, said screen having a dotted structure of apertures in a black matrix and electroluminescent material in the apertures, the method comprising:

exposing a photosensitive material on the panel to light emitted by a point source;

passing the light through a segmented lens and a mask, the segmented lens comprising an array of facets with boundaries between them, at least two of the facets having respective top surfaces inclined at mutually different angles;

providing each facet of the array of facets with a light-refracting means having a base surface coinciding with its top surface and at least a first and a second light-refracting surface disposed at predetermined angles with respect to the base surface, thereby creating a number of virtual light sources corresponding to the number of light-refracting surfaces; and simultaneously with the exposure of the photosensitive material, changing the relative position between the segmented lens and the panel in a direction oblique to the boundaries of the facets, the extent and direction of changing the relative position being such that, in moving from one extreme position to another extreme position, an image of a first facet on the panel occupies substantially an extreme position previously occupied by an image of a second facet obliquely adjacent to the first facet.

2. A method of producing a screen for a color display device as claimed in claim 1, characterized in that the light-refracting surfaces are inclined in the frame direction in such a way that the virtual light sources are separated in said direction.

3. A screen of a color display device produced by means of the method as claimed in claim 2.

4. A method of producing a screen for a color display device as claimed in claim 1, characterized in that the light-refracting means has three light-refracting surfaces, the two outer surfaces being inclined in the line direction in such a way that the virtual light sources are separated in said direction.

5. A screen of a color display device produced by means of the method as claimed in claim 4.

6. A screen of a color display device produced by means of the method as claimed in claim 1.

7. A screen of a color display device produced by means of the method as claimed in claim 4, characterized in that the apertures in the black matrix corresponding to the three light-refracting surfaces of a facet are the disjunct apertures belonging to a single triplet.

8. A color display device provided with a screen on a panel for a color display device, said screen having a dotted structure of apertures in a black matrix and electroluminescent material in the apertures, said screen being produced by a method comprising:

exposing a photosensitive material on the panel to light emitted by a point source;

passing the light through a segmented lens and a mask, the segmented lens comprising an array of facets with boundaries between them, at least two of the facets having respective top surfaces inclined at mutually different angles;

providing each facet of the array of facets with a light-refracting means having a base surface coinciding with its top surface and at least a first and a second light-refracting surface disposed at predetermined angles with respect to the base surface, thereby creating a number of virtual light sources corresponding to the number of light-refracting surfaces; and simultaneously with the exposure of the photosensitive material, changing the relative position between the segmented lens and the panel in a direction oblique to the boundaries of the facets, the extent and direction of changing the relative position being such that, in moving from one extreme position to another extreme position, an image of a first facet on the panel occupies substantially an extreme position previously occupied by an image of a second facet obliquely adjacent to the first facet.

* * * * *